(12) United States Patent
Dudar

(10) Patent No.: US 10,969,294 B2
(45) Date of Patent: Apr. 6, 2021

(54) METHOD AND SYSTEM FOR FUEL SYSTEM LEAK DETECTION

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 150 days.

(21) Appl. No.: 16/255,740

(22) Filed: Jan. 23, 2019

(65) Prior Publication Data
US 2020/0232870 A1     Jul. 23, 2020

(51) Int. Cl.
| | |
|---|---|
| *G01M 3/02* | (2006.01) |
| *G01M 3/26* | (2006.01) |
| *B60K 15/035* | (2006.01) |
| *B60K 11/08* | (2006.01) |

(52) U.S. Cl.
CPC ............. *G01M 3/025* (2013.01); *G01M 3/26* (2013.01); *B60K 11/085* (2013.01); *B60K 15/035* (2013.01)

(58) Field of Classification Search
CPC ...... G01M 3/025; G01M 3/26; B60K 15/035; B60K 11/085
See application file for complete search history.

(56) References Cited

U.S. PATENT DOCUMENTS

| | | | |
|---|---|---|---|
| 5,817,925 A * | 10/1998 | Cook ................. | F02M 25/0818 73/40 |
| 9,140,627 B2 | 9/2015 | Dudar et al. | |
| 9,512,791 B1 | 12/2016 | Dudar et al. | |
| 9,670,824 B2 | 6/2017 | Sowards et al. | |
| 9,827,848 B1 | 11/2017 | Sangha et al. | |
| 2013/0223980 A1 | 8/2013 | Pastrick et al. | |
| 2014/0109846 A1* | 4/2014 | Styles ....................... | F01P 7/08 123/41.12 |
| 2016/0368366 A1 | 12/2016 | Miller et al. | |
| 2016/0377005 A1* | 12/2016 | Dudar ................ | F02M 25/0854 701/103 |
| 2017/0361698 A1 | 12/2017 | Hussain | |

FOREIGN PATENT DOCUMENTS

| | | | |
|---|---|---|---|
| JP | 202020325 A | * | 8/2018 |
| KR | 101891028 B1 | * | 8/2018 |

* cited by examiner

*Primary Examiner* — Peter J Macchiarolo
*Assistant Examiner* — Fatemeh Esfandiari Nia
(74) *Attorney, Agent, or Firm* — Geoffrey Brumbaugh; McCoy Russell LLP

(57) ABSTRACT

Methods and systems are provided for expediting the generation of positive pressure and vacuum during corresponding phases of a fuel system leak test. Adjustments to the settings of active grille shutters and air dams enables heat to be trapped in the vehicle for the pressure phase and a cooling air flow to be provided during a vacuum phase. The adjustments enable the response time and completion frequency of an EONV test to be improved.

19 Claims, 8 Drawing Sheets

AAD Retracted

AAD Deployed

| Condition | AGS | AAD |
|---|---|---|
| Engine-on | More closed at higher Vs; More open at lower Vs | Lower at higher Vs; Retract at lower Vs |
| Engine-off, no leak test | Open | Retract |
| Engine-off, pressure phase of leak test | Close | Lower |
| Engine-off, vacuum phase of leak test | Open | Retract |

FIG. 6

METHOD AND SYSTEM FOR FUEL SYSTEM LEAK DETECTION

FIELD

The present description relates generally to methods and systems for using vehicle grille shutters and air dams to improve the completion efficiency of an engine-off leak test.

BACKGROUND/SUMMARY

Evaporative emissions from a vehicle's fuel system may be identified using engine-off natural vacuum (EONV) during conditions when a vehicle engine is not operating. The EONV test relies on heat rejection from a hot, running engine to reach the fuel tank and warm the bulk fuel during vehicle operation. At key-off, when the fuel system is sealed from the atmosphere, the rejected heat causes the pressure in the fuel tank to build. Once the pressure has exceeded a threshold, the fuel system is unsealed and a rate of pressure drop is correlated with the presence or absence of a leak. If the pressure threshold is not met, the positive pressure test is aborted and the fuel system is resealed in anticipation of a vacuum build and the execution of a vacuum based leak test. Therein once the vacuum has exceeded a threshold, the fuel system is unsealed and a rate of vacuum drop is correlated with the presence or absence of a leak.

One example of performing a positive and negative pressure leak test in a vehicle after key-off is shown by Dudar et al. in U.S. Pat. No. 9,140,627. Therein, a cooling fan is used to increase the engine-off fuel tank vacuum.

The inventors herein have recognized potential issues with the approach of '627, as well as EONV tests in general. As an example, abortion of the positive pressure leak test due to insufficient positive pressure generation may result in a drop in the completion frequency of the leak test monitor. This may result in the vehicle falling short on a monitoring performance requirement. As another example, increased reliance on the vacuum phase of the leak test may skew the results of the monitor. Specifically, due to current and future vehicle configurations (e.g., start-stop vehicles, hybrid vehicles, etc.) have increasing limited engine run times, the amount of heat rejected into the fuel system during vehicle propulsion is reduced. This reduces the likelihood of sufficient positive pressure build-up, and causes the monitor to rely more heavily on the vacuum phase of the leak test. As a further example, the vacuum-based leak test is prone to false failures based on customer driving, parking habits, as well as ambient temperature. For example, a refueling event that fills the fuel tank with relatively cool liquid fuel followed by a short ensuing trip may fail to heat the fuel bulk mass and may result in a false fail if an EONV test is run. As another example, during mild weather conditions, the ambient temperature may restrict the amount of heating or cooling of the fuel tank following engine shut-off, and thus limit the rate of pressure or vacuum development. As such, vacuum may not reach expected threshold levels in the time allotted for the EONV test based on available battery charge. This may result in a false-fail condition, leading to potentially unnecessary engine service. Even if a cooling fan is operated to expedite the cooling, the cooling fan assistance may be limited by battery charge availability at the end of a drive cycle. In particular, the amount of stored battery charge that can be used for running the vehicle controller to complete the EONV test as well as to provide cooling fan assistance may be limited to a duration (e.g. 45 minutes) in order to maintain sufficient battery charge to restart the vehicle.

The inventors herein have recognized that vehicle active grille shutters (AGS) and active air dams (AAD) that are used during vehicle propulsion to reduce turbulence, can be used after vehicle propulsion to control air flow for improving leak test completion efficiency. For example, the issues described above may be addressed by a method for a vehicle comprising: responsive to a vehicle key-off, transitioning an active air dam system (AAD) of the vehicle to a more deployed position; and transitioning an active grille shutter system (AGS) of the vehicle to a more closed position. In this way, the robustness of an EONV test is improved.

As an example, at a vehicle off event, such as at vehicle key-off, a pressure phase of the EONV leak test may be initiated. To increase the amount of heat rejected from the engine to the fuel system, the amount of engine heat that is trapped inside the vehicle frame is increased via adjustments to the AGS and AAD. In particular, the AGS may be moved to a more closed position while the AAD is extended downward at key-off to create a thermal filter around the vehicle that traps engine and waste heat. As a result, when the fuel system is sealed, sufficient heat rejected to the fuel system to enable the fuel tank pressure to rapidly exceed the pressure threshold for the positive pressure phase of the leak test. Then, during the vacuum phase of the leak test, the AGS may be moved to a more open position while the AAD is retracted upward to increase air flow across the engine, fuel system, and vehicle underbody to cool off the fuel and assist in the development of vacuum inside the fuel tank. As a result, when the fuel system is sealed, the fuel tank pressure can rapidly drop to the vacuum threshold for the vacuum phase of the leak test.

In this way, air flow adjustments enabled by vehicle grille shutters and air dams at a vehicle off event can be leveraged to increase heat rejection from an engine to a fuel system. The technical effect of closing the grille shutters and extending the air dams during a pressure phase of an engine-off leak test is that more heat can be trapped within the vehicle frame for subsequent heat rejection to a fuel tank. This improves the likelihood of a positive pressure threshold of the test being met, as well as the completion efficiency of the pressure phase of the leak test. The technical effect of opening the grille shutters and raising the air dams during a vacuum phase of the engine-off leak test is that more cool air can be flowed across vehicle components. This improves the likelihood of a vacuum threshold of the test being met, as well as the completion efficiency of the vacuum phase of the leak test. By ensuring completion of both pressure and vacuum phases of the monitor, a vehicle monitoring performance requirement can be met. By enabling improved heat rejection, the EONV test can be completed within the allotted time, and the robustness of the EONV test is improved. By reducing the need for operating a cooling fan, sufficient system battery charge can be maintained for a subsequent engine restart.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows a table of example AAD and AGS positions during engine-on and engine-off conditions.

DETAILED DESCRIPTION

Figure 1:
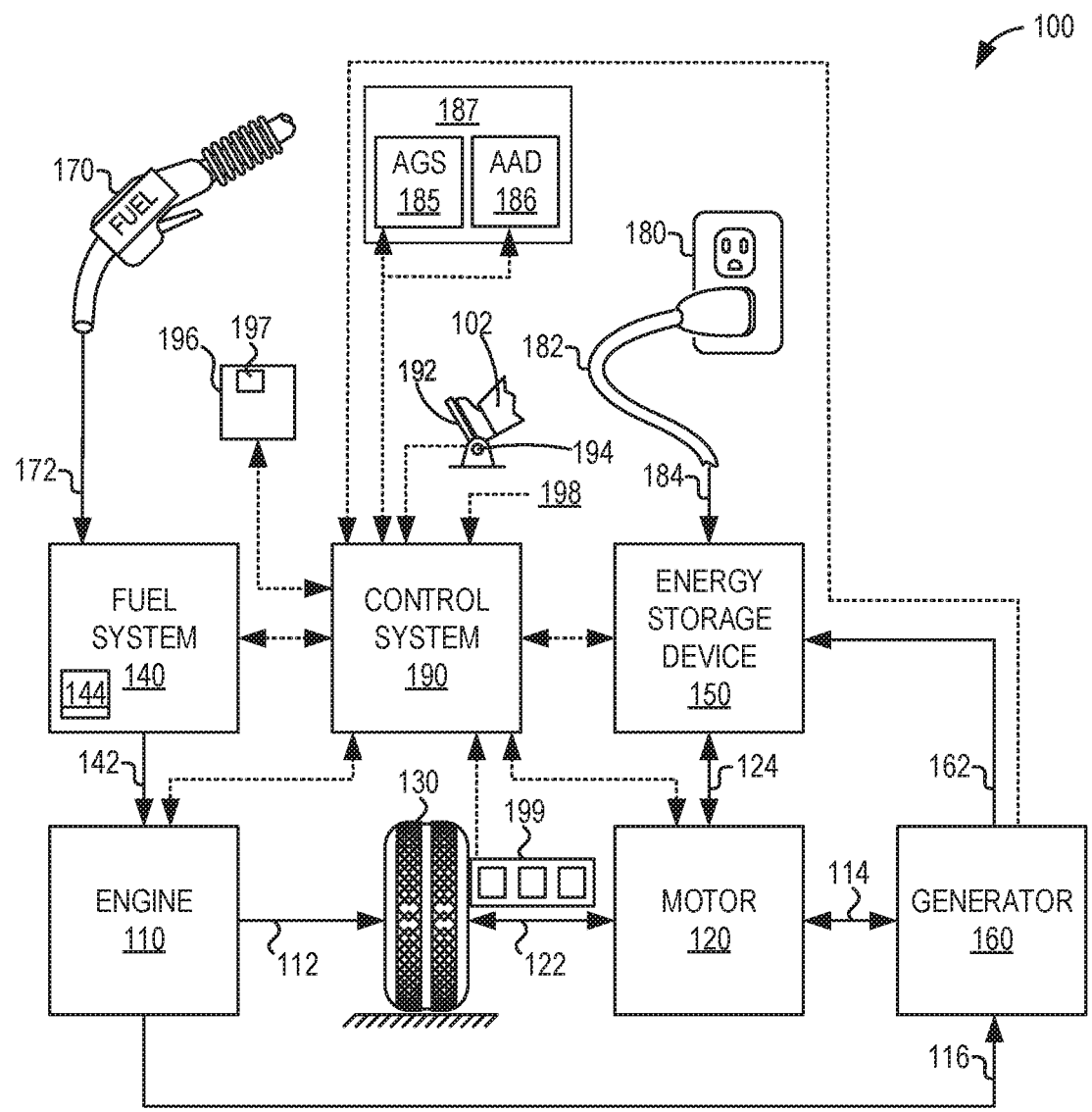
FIG. 1 shows an example vehicle propulsion system including active air dams (AAD) and active grille shutters (AGS).
Figure 3A:
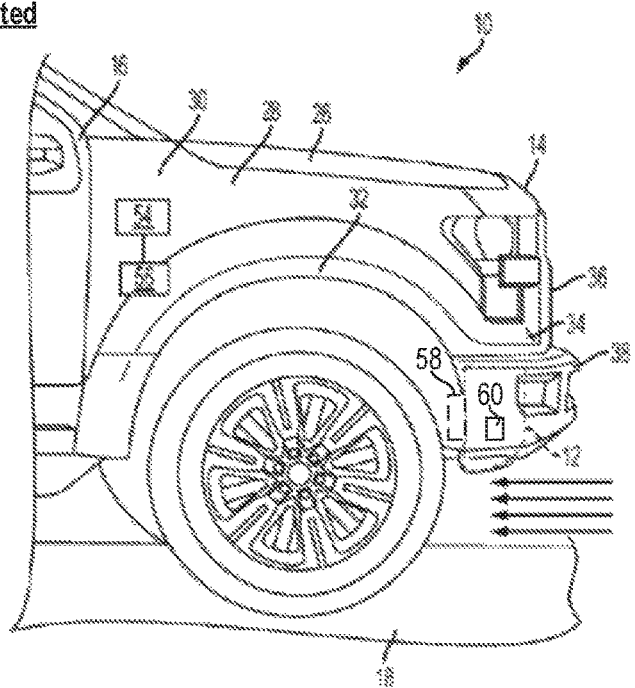
FIGS. 3A and 3B show an active air dam (AAD) system of a vehicle in retracted and deployed positions, respectively.
Figure 3B:
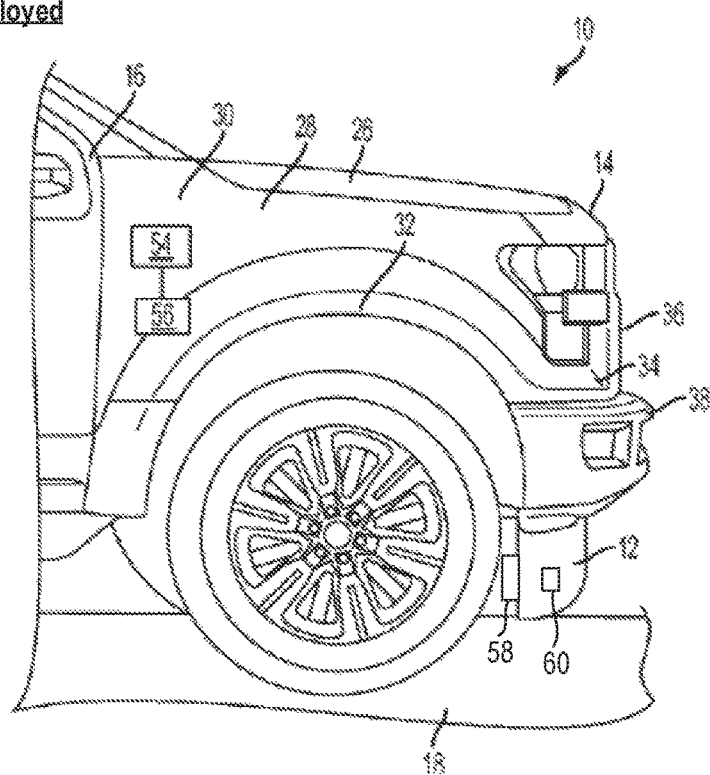
Figure 4:
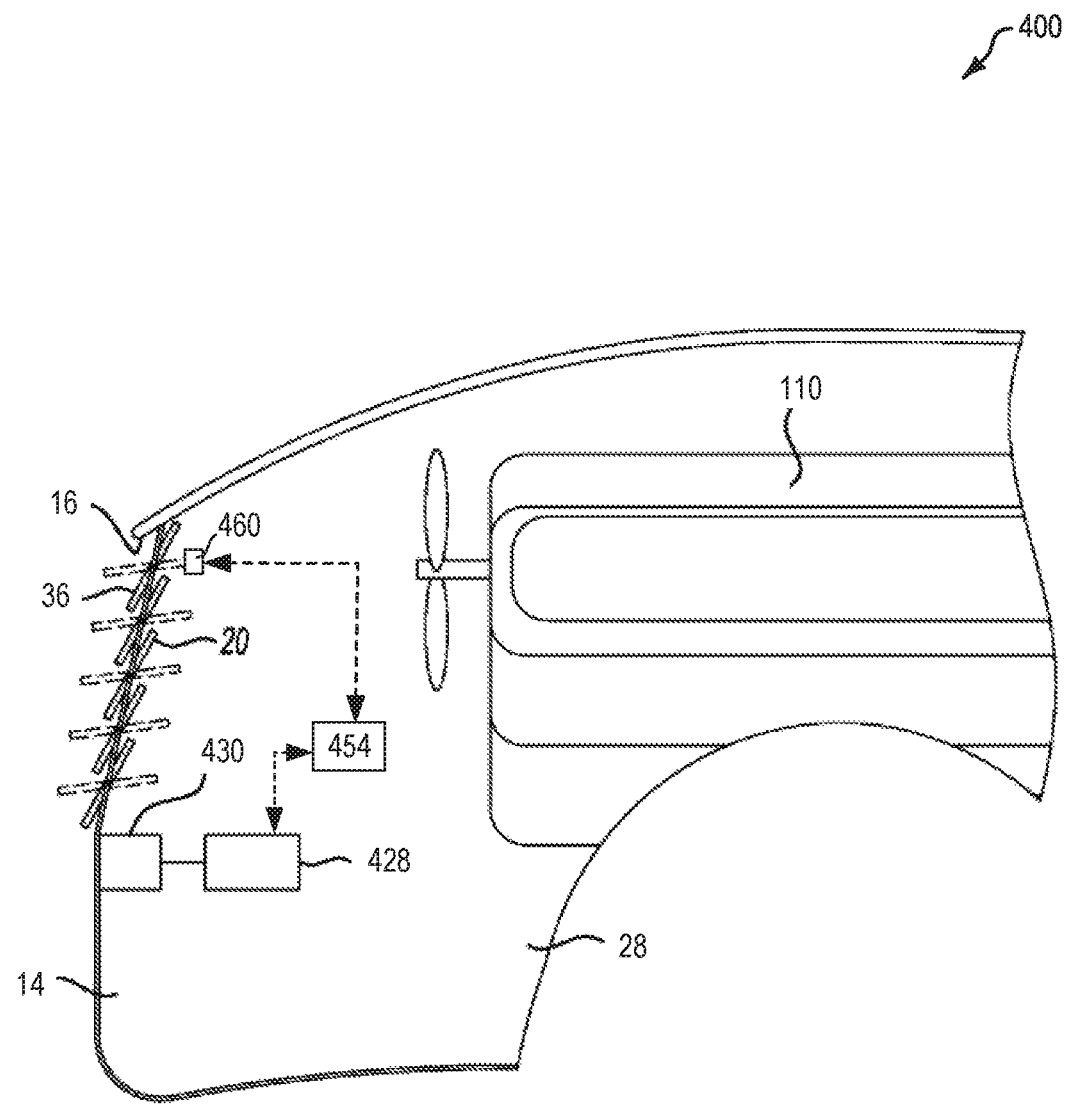
FIG. 4 shows an active grille system (AGS) of the vehicle in open and closed positions.

The following description relates to systems and methods for improving the completion efficiency of a fuel system leak test in a vehicle system, such as in the hybrid vehicle system of FIG. 1. Changes in a fuel tank pressure after a vehicle-off event can be used to infer the presence of a fuel system leak, such as in the fuel system of FIG. 2. The position of active grille shutters (AGS) and active air dams (AAD), as shown at FIGS. 3A-3B and 4, may be adjusted to vary vehicle air flow during the leak test. A vehicle controller may be configured to execute a control routine, such as the example routine of FIGS. 5A-5B, to adjust the AAD and ADS during the pressure and vacuum phases of the leak test to increase overall heat rejection, and expedite the attainment of pressure thresholds in each phase. Example ADS and AGS adjustments are tabulated at FIG. 6 and depicted with reference to the prophetic example of FIG. 7. In this way, the robustness of an EONV leak test is improved.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196 (herein also referred to as message center).

The vehicle propulsion system 100 may also include an ambient temperature/humidity sensor 198, and a roll stability control sensor, such as a lateral and/or longitudinal and/or yaw rate sensor(s) 199. Further, the sensor(s) may include a vertical accelerometer to indicate road roughness. These devices may be connected to control system 190. In one example, the control system may adjust engine output and/or the wheel brakes to increase vehicle stability in response to sensor(s) 199.

The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling.

A front end of the vehicle includes a front fascia 187, located forward of a hood and quarter panels of the vehicle. The front fascia includes grilles of an active grille shutter system (AGS) 185 of the propulsion system. The grilles may be designed for vehicle styling and aesthetic appeal and may also include the vehicle manufacturer logo or may have ornamental design characteristics. As elaborated with reference to FIG. 4, by adjusting a position of the movable grilles and vanes of the vehicle, airflow may be directed into the engine compartment of the vehicle when the vehicle is driven. Opening the vanes of the AGS during vehicle driving may enable adequate cooling airflow to be provided to the engine compartment, to reduce aerodynamic drag and improve fuel economy. Under other driving conditions, such as when the ambient air and engine are cold, it may be advantageous to reduce air flow into the engine compartment by closing the vanes to allow the engine to warm more quickly and provide warm air sooner through the heating and air conditioning system. An electric motor that drives a gear set may be used to operate the active grille shutters and vary a degree of opening of the movable vanes of the AGS. As elaborated with reference to FIGS. 5A-5B, during vehicle-off conditions, the position of the vanes and grilles of the AGS 185 may be adjusted to limit engine cooling through the engine during a pressure phase of a leak test, and increase engine cooling during a vacuum phase of the leak test.

Front fascia 187 also includes a front air dam panel of an active air dam system (AAD) 186. In alternate examples, the active air dam system may include additional side skirts fixed to the side of a vehicle, such as in truck embodiments. As elaborated with reference to FIGS. 3A-3B, the air dam panel may be movable between a stowed (or retracted) position behind a front bumper, and a lowered (or deployed) position below the front bumper. In the stowed position, the air dam causes an increase in airflow beneath the vehicle which generates aerodynamic drag and lift. In the deployed position, the air dam panel reduces airflow beneath the vehicle to improve fuel economy and vehicle drivability. During vehicle propulsion, a position of the AAD may be varied between the stowed and deployed positions (and to any position there-between) based at least on vehicle speed. As elaborated with reference to FIGS. 5A-5B, during vehicle-off conditions, the position of the air dams of AAD 186 may be adjusted to limit engine cooling through the engine during a pressure phase of a leak test, and increase engine cooling during a vacuum phase of the leak test. The AAD 186 adjustments may be coordinated with AGS 185 adjustments to enable pressure and/or vacuum thresholds of the leak test to be attained in the limited engine-off leak testing time.

Figure 2:
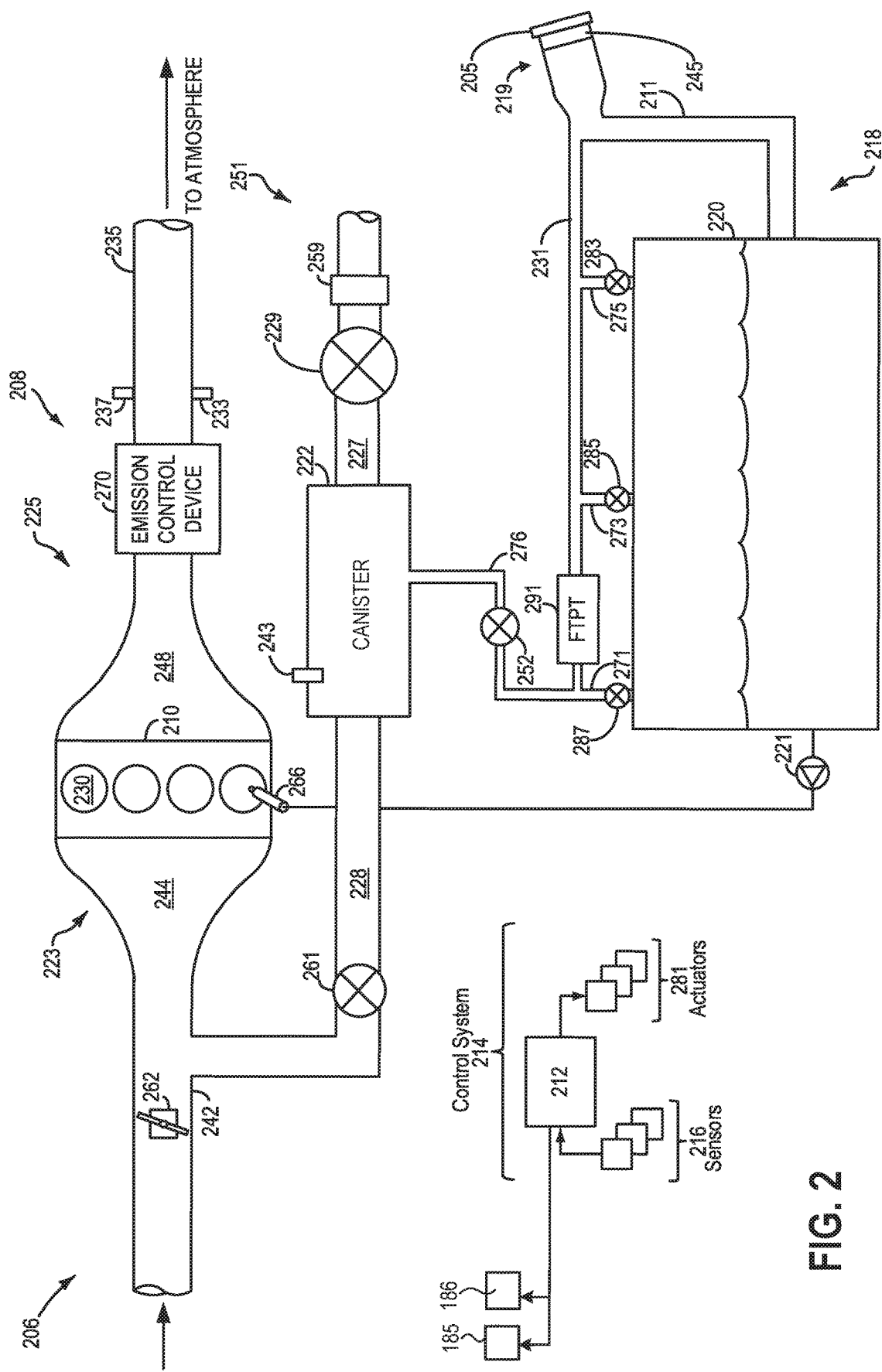
FIG. 2 shows an example fuel system and evaporative emissions system that may be coupled to the vehicle propulsion system of FIG. 1.

FIG. 2 shows a schematic depiction of a vehicle system 206. The vehicle system 206 includes an engine system 208 coupled to an emissions control system 251 and a fuel system 218. Emissions control system 251 includes a fuel vapor container such as fuel vapor canister 222 which may be used to capture and store fuel vapors. In some examples, vehicle system 206 may be a hybrid electric vehicle system, such as vehicle system 100 of FIG. 1.

The engine system 208 may include engine 210 having a plurality of cylinders 230. In one example, engine 210 includes engine 110 of FIG. 1. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. In one example, fuel tank 220 includes fuel tank 144 of FIG. 1. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system.

Vapors generated in fuel system 218 may be routed to an evaporative emissions control system 251 which includes fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe 211 or neck 211.

Further, fuel filler system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refueling request, e.g., a vehicle operator initiated request via actuation of a refueling button on a vehicle dashboard (such as refueling button 197 on dashboard 196 of FIG. 1), the fuel tank may be depressurized and the fuel cap unlocked after the pressure or vacuum in the fuel tank falls below a threshold. Herein, unlocking the refueling lock 245 may include unlocking the fuel cap 205. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more fuel vapor canisters 222 (herein also referred to simply as canister) filled with an appropriate adsorbent, the canisters configured to temporarily trap fuel vapors (including vaporized hydrocarbons) generated during fuel tank refilling operations and "running loss" vapors (that is, fuel vaporized during vehicle operation). In one example, the adsorbent used is activated charcoal. Emissions control system 251 may further include a canister ventilation path or vent line 227 which may route gases out of the fuel vapor canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions (such as certain engine running conditions) so that vacuum from engine intake manifold 244 is applied on the fuel vapor canister for purging. In some examples, vent line 227 may include an optional air filter 259 disposed therein upstream of canister 222. Flow of air and vapors between canister 222 and the atmosphere may be regulated by a canister vent valve 229.

Fuel tank 220 is fluidically coupled to canister 222 via conduit 276 which includes a fuel tank isolation valve (FTIV) 252 for controlling the flow of fuel tank vapors into canister 222. FTIV 252 may be normally closed so that fuel tank vapors (including running loss and diurnal loss vapors) can be retained in the fuel tank, such as in the ullage space of the fuel tank. In one example, FTIV 252 is a solenoid valve.

In configurations where the vehicle system 206 is a hybrid electric vehicle (HEV), fuel tank 220 may be designed as a sealed fuel tank that can withstand pressure fluctuations typically encountered during normal vehicle operation and diurnal temperature cycles (e.g., steel fuel tank).

In addition, the size of the canister 222 may be reduced to account for the reduced engine operation times in a hybrid vehicle. However, for the same reason, HEVs may also have limited opportunities for fuel vapor canister purging operations. Therefore the use of a sealed fuel tank with a closed FTIV (also referred to as NIRCOS, or Non Integrated Refueling Canister Only System), prevents diurnal and running loss vapors from loading the fuel vapor canister 222, and limits fuel vapor canister loading via refueling vapors only. FTIV 252 may be selectively opened responsive to a refueling request so depressurize the fuel tank 220 before fuel can be received into the fuel tank via fuel filler pipe 211.

In some embodiments, an additional pressure control valve (not shown) may be configured in parallel with FTIV 252 to relieve any excessive pressure generated in the fuel tank, such as while the engine is running or even vent excessive pressure from the fuel tank when the vehicle is operating in electric vehicle mode, for example in the case of a hybrid electric vehicle.

When opened, FTIV 252 allows for the venting of fuel vapors from fuel tank 220 to canister 222. Fuel vapors may be stored in canister 222 while air stripped off fuel vapors exits into atmosphere via canister vent valve 229. Stored fuel vapors in the canister 222 may be purged to engine intake 223, when engine conditions permit, via canister purge valve 261.

Fuel system 218 may be operated by a controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open FTIV 252 and canister vent valve 229 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open FTIV 252 and CVV 229, while maintaining canister purge valve 261 closed, to depressurize the fuel tank before allowing enabling fuel to be added therein. As such, FTIV 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 and canister vent valve 229 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 222 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Controller 212 may also be configured to intermittently perform leak detection routines on fuel system 218 to confirm that the fuel system is not degraded. As such, various diagnostic leak detection tests may be performed while the engine is off (engine-off leak test) or while the engine is running (engine-on leak test). Leak tests performed while the engine is running may include applying engine vacuum on the fuel system for a duration (e.g., until a target fuel tank vacuum is reached) and then sealing the fuel system while monitoring a change in fuel tank pressure (e.g., a rate of change in the vacuum level, or a final pressure value). Leak tests performed while the engine is not running may include sealing the fuel system following engine shut-off and monitoring a change in fuel tank pressure. This type of leak test is referred to herein as an engine-off natural vacuum test (EONV). The natural vacuum leak test relies on heat rejection to generate a vacuum. Specifically, heat generated at the engine during vehicle propulsion is rejected to the fuel tank. At vehicle-off, when the fuel system is sealed, the fuel tank pressure rises above a pressure threshold due to the rejected heat. The fuel system is then unsealed and a rate of drop in the pressure is monitored. This constitutes the positive pressure phase of the leak test. A higher than expected rate (e.g., in relation to a system with no leaks, or a system with leaks of a predetermined size) is correlated with the presence of a leak. Then, the fuel system is sealed again to generate a vacuum. Specifically, as the pressure in the fuel tank drops tank cools and fuel vapors are condensed to liquid fuel due to the engine being shutdown, a vacuum is generated in the sealed fuel system. The fuel system is then unsealed and a rate of drop in the vacuum is monitored. This constitutes the negative pressure or vacuum phase of the leak test. A higher than expected rate (e.g., in relation to a system with no leaks, or a system with leaks of a predetermined size) is correlated with the presence of a leak. As elaborated at FIGS. 3A-3B, a position of AAD 186 and a degree of opening of AGS 185 may be coordinated during a vehicle-off event to optimize heat rejection from the engine to the fuel system. This enables the pressure and vacuum thresholds of the pressure and vacuum phases of the leak test to be attained in an expedited manner, and for the EONV test to be completed in a timely and reliable manner.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, fuel tank pressure transducer (FTPT) or pressure sensor 291, and canister temperature sensor 243. As such, pressure sensor 291 provides an estimate of fuel system pressure. In one example, the fuel system pressure is a fuel tank pressure, e.g. within fuel tank 220. Other sensors such as pressure, temperature, air/fuel ratio, and composition sensors may be coupled to various locations in the vehicle system 206. As another example, the actuators may include fuel injector 266, throttle 262, FTIV 252, pump 221, refueling lock 245, AGS 185, and AAD 186. The control system 214 may include a controller 212. The controller may receive input data from the various sensors, process the input data, and trigger the actuators in response to the processed input data based on instruction or code programmed therein corresponding to one or more routines. An example control routine is described herein with regard to FIGS. 5A-5B. The controller 212 receives signals from the various sensors of FIGS. 1-2 and employs the various actuators of FIGS. 1-2 to adjust vehicle operation based on the received signals and instructions stored on a memory of the controller.

For example, responsive to vehicle-off leak test conditions being met, the controller may command the FTIV and the CVV closed so as to seal the fuel system from the atmosphere. At the same time, based at least on sensed ambient temperature, the controller may adjust the opening of AGS 185 and the position of AAD 186 to optimize heat rejection for generating pressure or vacuum for the leak test.

Turning now to FIGS. 3A-3B, a side perspective view of a passenger vehicle 10 is illustrated. The vehicle includes an aerodynamic device coupled to the vehicle body, depicted herein as a front air dam panel 12 of an active air dam (AAD) system, such as AAD system 186 of FIG. 1. Herein, AAD panel 12 is also referred to as a shutter of the AAD. In FIG. 3A, the air dam panel 12 is raised up to a stowed or retracted position. FIG. 3B illustrates the air dam panel 12 in a deployed or lowered position.

FIGS. 3A and 3B illustrate the front end 14 of the vehicle 10 that is a truck or sport utility vehicle having a vehicle body 16 elevated relative to an underlying support surface 18 upon which the vehicle 10 travels. The front end 14 of the vehicle 10 includes an area forward of a passenger compartment in the longitudinal direction. The front end 14 includes a hood 26 defining an engine compartment 28 there beneath. The front end also includes front quarter panels 30 on opposed lateral sides of the vehicle 10. Each quarter panel 30 defines a front wheel well 32 illustrated on a right side of the vehicle 10. The left quarter panel is generally a mirror image. The engine compartment 28 is located laterally between the quarter panels 30.

The front end 14 also includes a front fascia 34. The front fascia 34 is generally located forward of the hood 26 and quarter panels 30. The front fascia 34 includes the front grille 36 and the bumper 38. The front grille 36 defines an opening to the engine compartment 28 in order to allow airflow into the air induction system and for cooling of the engine compartment 28. The grille 36 may be designed for vehicle styling and aesthetic appeal and may also include the vehicle manufacturer logo or may have ornamental design characteristics. In addition, the grille may include movable vanes whose position can be adjusted to vary air flow through the engine. An example embodiment of the grille with the movable vanes in shown at FIG. 4.

The bumper 38 provides energy absorption in the event of a front impact crash. As illustrated, the bumper 38 may extend forward of the grille 36. However, in other embodiments, the bumper 38 may be generally flush with the grille 36.

While the depicted example shows the air dam panel 12 configured as a front air dam panel coupled to a front bumper of the vehicle, in alternate embodiments, the active air dam system may include side skirts fixed to the side of a vehicle, such as in truck embodiments.

As shown in FIG. 3A, in the retracted position, the air dam panel 12 is stowed behind a front bumper causing an increase in airflow beneath the vehicle (depicted by arrows). This results in aerodynamic drag and lift which degrades fuel economy and reduces drivability. As shown in FIG. 3B, in the deployed position, the air dam panel 12 is moved downward in the vertical direction in order to reduce airflow beneath the vehicle. In the deployed position, the front air dam panel 12 may extend an additional distance below a lower surface 40 of the bumper 38 or the front fascia 34. The air dam panel 12 may be offset from the front bumper 38 so that the air dam panel 12 is not flush with the bumper 38 in the vertical direction. As a result of the deployment of the air dam, ram air is deflected such that a smaller amount of the ram air is directed under the vehicle while a larger portion of the ram air is directed over the vehicle, reducing drag and thereby improving fuel economy and vehicle drivability.

Unlike air dams which extend from the bumper and are located close to the ground to prevent air from flowing underneath the vehicle, trucks and utility passenger vehicles like those illustrated in FIGS. 3A and 3B may maintain a minimum ground clearance in order to prevent colliding with obstacles under certain road condition. Therefore, the front air dam panel 12 can be moved to the deployed position illustrated in FIG. 3B when road conditions are determined to be safe.

A deployable air dam assembly 50 may also include a controller 54 configured with instructions that when executed cause the air dam panel 12 to be actively actuated between the deployed position and the retracted position. In particular, controller 54 may command control signals to a mechanical linkage 58 coupling the air dam panel 12 to a body of vehicle 10. The mechanical linkage 58 may be configured, in one example, as a mechanical arm. The controller 54 may command the linkage to raise the AAD panel behind the bumper to transition the AAD to the retracted or stowed position. For example, the AAD panel may be stowed at low to mid vehicle speeds, during in-city driving, or when the vehicle is parked. The controller 54 may also command the linkage to lower the AAD panel below the bumper to transition the AAD to the deployed position. For example, the AAD panel may be deployed at mid to high vehicle speeds or when the vehicle is cruising on a highway.

In the deployed position (FIG. 3B), the air dam panel 12 is lowered to a closer distance to the driving surface. The air dam panel 12 prevents some of the air from flowing beneath the vehicle and along the vehicle underbody by redirecting flow around the vehicle instead. As a result, aerodynamic flow is improved. The improved aerodynamic flow, particularly at higher vehicle speeds, results in an improvement in vehicle fuel economy. In comparison, in the retracted or stowed position (FIG. 3A), the air dam panel 12 is located substantially above the driving surface 18 and does not generally redirect airflow. As a result, aerodynamic drag can occur, particularly at higher vehicle speeds, causing a drop in vehicle fuel economy.

It will be appreciated that while the depicted example illustrates two settings for the AAD (deployed and retracted), this is not meant to be limiting. In other embodiments, one or more intermediate positions or settings.

The air dam panel 12 may be capable of being positioned at many different deployed positions based on vehicle speed or environmental conditions, for example. The air dam controller 54 may control the deployed position of the air dam panel 12 based on speed or road obstacles. For example, the air dam panel 12 may be raised to the stowed position if the vehicle is being driven at lower speeds where there is not large drag, or if an obstacle is detected that could potentially damage the air dam panel 12 is detected via a vehicle sensor 56. Vehicle sensor 56 may be any type of device used for detecting distance between the vehicle 10 and an externally located object, such as radar, a camera, LIDAR or even vehicle-to-vehicle communication.

The vehicle 10 may also include a position sensor 60 that is coupled to air dam panel. In an alternate example, the position sensor 60 may be coupled to the linkage 58 of the air dam panel. The sensor 60 may estimate a position of the air dam panel. In particular, an output of position sensor 60 may change responsive to a commanded change in position of the air dam panel between the deployed and retracted positions.

Vehicle sensors 56, 60 are in communication with controller 54 and provide data signals to the controller 54. The controller 54 may identify a change in AAD position, as commanded, based on a change in output of sensor 60 following a change in signals commanded to linkage 58. As elaborated with reference to FIGS. 5A-5B and FIG. 6, AAD actuation may be further adjusted after a vehicle off event to maximize heat rejection from the engine to a fuel tank. Therein, after an engine is shutdown, the AAD may first be transitioned to the lowered position to create a thermal filter that traps engine and waste heat within the frame of the vehicle. This trapped heat is then rejected from the engine to the fuel tank during a pressure phase of an EONV leak test. Then, after the pressure phase of the test has been completed, the AAD may be transitioned to the retracted position to enhance engine cooling and expedite vacuum generation at the fuel tank during a vacuum phase of an EONV leak test.

Turning now to FIG. 4, a front end 14 of the vehicle 10 (such as vehicle 10 of FIGS. 3A-3B, or vehicle system 100 of FIG. 1) is diagrammatically shown to illustrate an active grille shutter (AGS) system 185 (such as AGS 185 of FIG. 1). Grille 36 covers a grille opening 16 at the front end of the vehicle. Embodiment 400 shows the grille 36 in a closed position in solid lines and an open position in phantom (dashed) lines. Movable vanes 20 of the grille are shown in a closed position in solid lines and in phantom lines in the open position. When the grille 36 is open, maximum air flow is provided into the engine compartment 28 through the vanes 20. To improve fuel economy, the vanes 20 may be closed, as shown in solid lines, to direct air more aerodynamically over the vehicle 10. An engine 110 is shown in the engine compartment 28 that has components that require cooling and protection from excessive heat. The vanes 20 may be closed to improve heater performance by allowing heat to build up within the engine compartment. As the engine coolant warms in cold temperatures, heat from the coolant is provided to the HVAC system of the vehicle as is well known in the art. While FIG. 4 illustrates an engine in the engine compartment, the active grille shutter system may also be used in conjunction with a battery-powered, fuel cell or hybrid vehicle to optimize operation of such systems to the extent that they are also affected by temperature within the compartment 28.

A motor 428 controls the opening and closing of vanes 20 and operates in conjunction with a gear reducer or gear set 430. The motor 428 may be an electric motor that is operable to provide at least two levels of torque through the gear set 430. During conditions when air flow through the grille is not required, such as at lower ambient temperatures, motor 428 may be provided with a first amount of current that results in a first, lower level of torque being delivered via the motor. At the low level of motor torque, the gears within the gear set 430 are subjected to a lower level of torque that is enough to hold the vanes closed. During conditions when air flow through the grille is required, such as at higher ambient temperatures and higher engine loads, motor 428 may be provided with a second amount of current that results in a second, higher level of torque being delivered via the motor. At the higher level of motor torque, the gears within the gear set 430 are subjected to a higher level of torque that is enough to hold the vanes open.

A position sensor 460 may be coupled to the movable vanes for sensing a position thereof and communicating the sensed position with controller 454. The controller 454 may identify a change in AGS position, as commanded, based on a change in output of sensor 460 following a change in signals commanded to motor 428 and gear set 430. As elaborated with reference to FIGS. 5A-5B and FIG. 6, AGS actuation may be further adjusted after a vehicle off event to maximize heat rejection from the engine to a fuel tank. Therein, after an engine is shutdown, the AGS may first be transitioned to a more closed position (e.g., fully closed) to create a thermal filter that traps engine and waste heat within the frame of the vehicle. This trapped heat is then rejected from the engine to the fuel tank during a pressure phase of an EONV leak test. Then, after the pressure phase of the test has been completed, the AGS may be transitioned to a more open position (e.g., fully open position) to enhance engine cooling and expedite vacuum generation at the fuel tank during a vacuum phase of an EONV leak test. Further, the position of AGS 185 may be coordinated with the position of AAD 184 (of FIGS. 3A-3B) to maximize vehicle-off heat rejection for a leak test.

In this way, the components of FIGS. 1-4 enable a vehicle system comprising: an engine; a fuel system including a fuel tank, a fuel vapor canister, a vent valve coupling the canister to atmosphere, and an isolation valve coupling the canister to the fuel tank; a pressure sensor coupled to the fuel system; an active air dam (AAD) coupled to a bumper of a vehicle body via a linkage; and an active grille system (AGS) including a plurality of movable vanes coupled to a front grille of the vehicle body. The vehicle system may include a controller storing instructions in non-transitory memory executable to: while the vehicle is keyed-on, adjust a setting of each of the AAD and the AGS as a function of vehicle speed; and while the vehicle is keyed-off, adjust the setting of each of the AAD and the AGS as a function of pressure phase or vacuum phase of an engine-off leak test. Additionally or optionally, when the vehicle is keyed-on, the AAD is deployed while the AGS is closed at higher than threshold vehicle speeds and the AAD is retracted while the AGS is opened at lower than threshold vehicle speeds, and where when the vehicle is keyed-off, the AAD is deployed while the AGS is closed during the pressure phase of the leak test, and the AAD is retracted while the AGS is opened during the vacuum phase of the leak test. Further, a degree of deployment of the AAD and a degree of closure of the AGS is increased during the pressure phase to raise a fuel tank pressure of the fuel system, when sealed, to above a first threshold pressure level, and wherein the degree of deployment of the AAD and the degree of closure of the AGS is decreased during the vacuum phase to lower the fuel tank pressure of the fuel system, when sealed, to below a first threshold vacuum level. The controller may optionally estimate heat rejection from the engine to the fuel system when the vehicle is keyed-off as a function of each of engine operation time prior to key-off, integrated air mass flow through the engine prior to the key-off, and ambient temperature at the key-off; and increase a degree of deployment of the AAD and a degree of closure of the AGS as the estimated heat rejection falls below a threshold heat, the threshold heat determined as a function of fuel temperature and fuel tank fill level at the key-off. In one example, the AAD is actuated to the deployed position by lowering the air dam below the vehicle bumper via the linkage, and the AAD is actuated to the retracted position by raising and stowing the air dam behind the vehicle bumper via the linkage. In one example, the AGS is closed by actuating the plurality of movable vanes, via a motor, to be substantially perpendicular to the front grille, and the AGS is opened by actuating the vanes to be substantially parallel to the front grille.

It will be appreciated that a vehicle key-off event as used herein is not limited to a vehicle off event where a vehicle is turned off via a key (active or passive) but is used generically to represent any vehicle off event wherein an operator has requested that a vehicle be turned off and propulsion of the vehicle via any torque (engine, motor, etc.) be stopped.

Figure 5A:
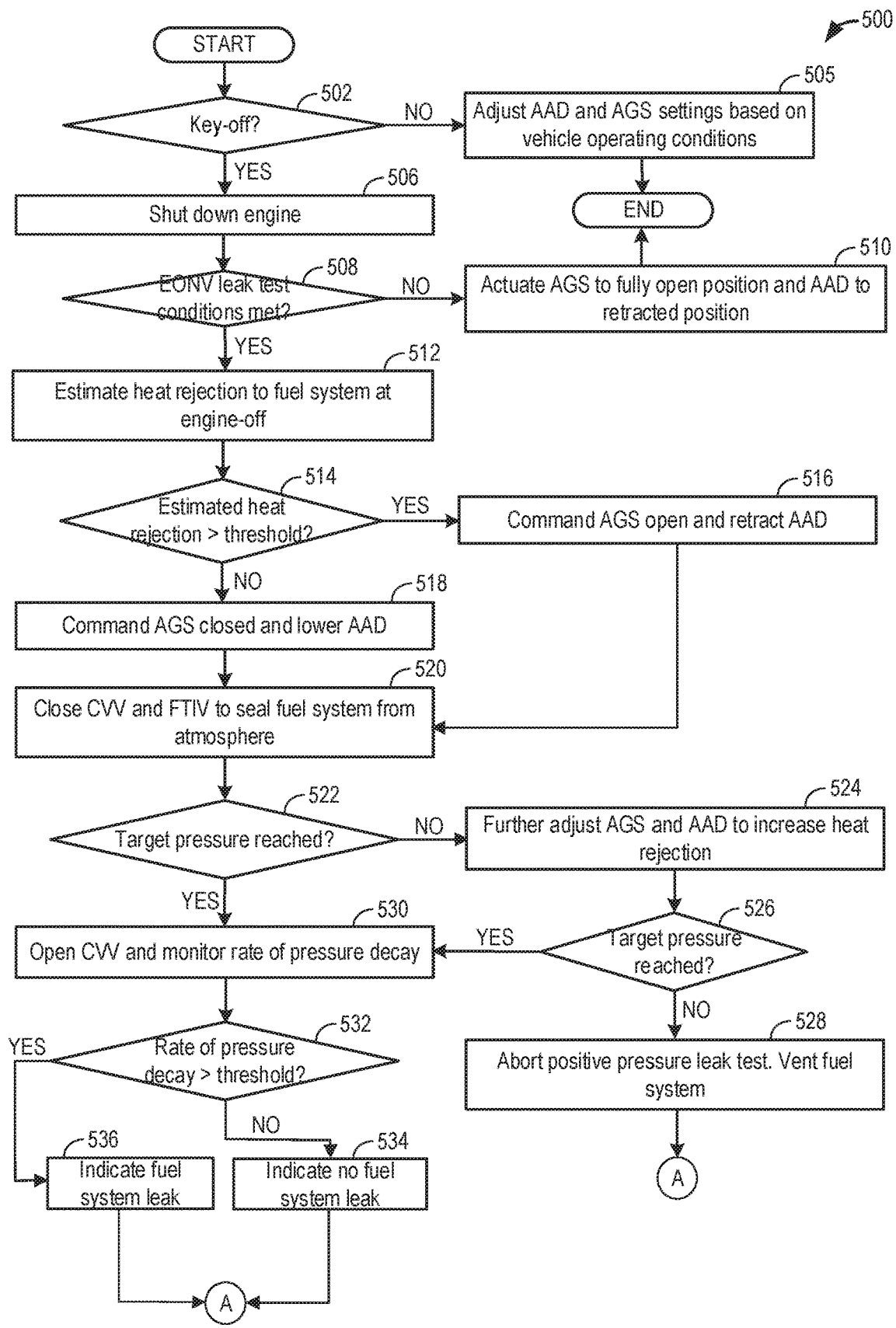
FIGS. 5A and 5B show a high-level flow chart of an example method for operating the AGS and AAD mechanism of the vehicle after a vehicle off event to improve EONV leak test completion.
Figure 5B:
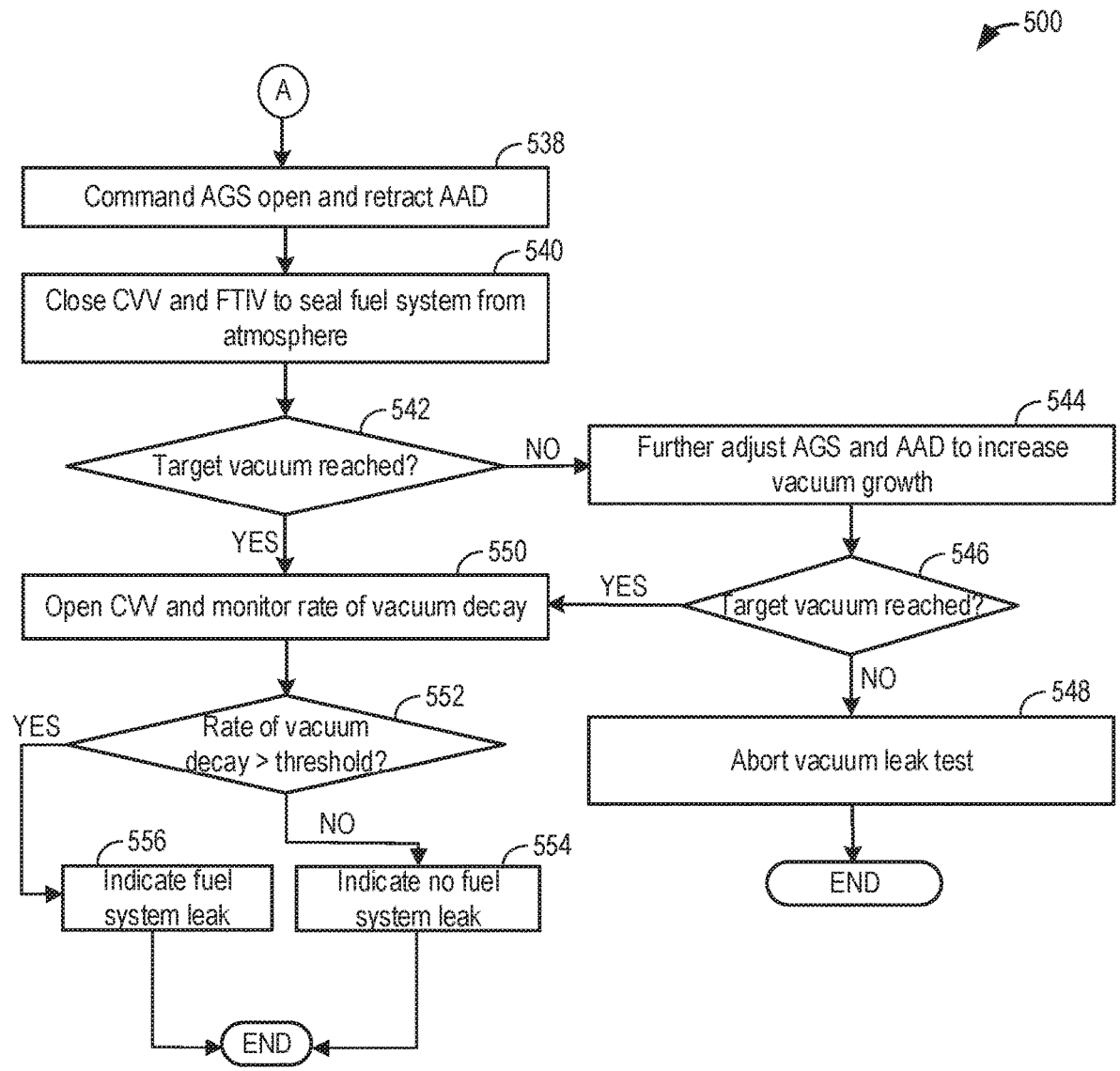

Turning now to FIGS. 5A-5B, an example method 500 is shown for adjusting vehicle AAD and AGS components during execution of an engine-off leak test. The method enables air flow adjustments enabled via the AGS and AAD to be leveraged for maximizing heat rejection for pressure and vacuum build-up during pressure and vacuum phases of the leak test. Instructions for carrying out method 500 may be executed by a controller based on instructions stored on a memory of the controller and in conjunction with signals received from sensors of the engine system, such as the sensors described above with reference to FIGS. 1-4. The controller may employ engine actuators of the engine system to adjust engine operation, according to the methods described below.

At 502, the method includes confirming a vehicle-off event. This may include, as an example, a key-off event wherein an operator indicates an intent to stop propelling a vehicle by removing an active key from an ignition slot, by actuating an ignition button from a start position to a stop position, or by removing a passive key from a vehicle cabin. As such, the operator may provide a request to turn off the vehicle via other methods and actuators.

If a vehicle-off event is not confirmed, then at 504, the method includes, while propelling the vehicle, adjusting a position or setting of each of the AAD and the AGS as a function of vehicle operating conditions, such as based on vehicle speed, engine temperature, and ambient temperature. As indicated with reference to table 600 of FIG. 6 (at 602), when the engine is combusting fuel and the vehicle is being propelled with at least engine torque, the AAD may be actuated to the deployed or lowered position at higher vehicle speeds so that air flow can be redirected under the vehicle, allowing for reduced lift and drag, and improved fuel economy. In comparison, at lower vehicle speeds, the AAD may be actuated to the raised or stowed position. Similarly, at higher vehicle speeds, the AGS may be actuated to a position where the grille vanes are more closed (e.g., at or near a fully closed position) to reduce drag force and improve fuel economy. At lower vehicle speeds, the AGS may be actuated to a position where the grille vanes are more open (e.g., at or near a fully open position) to allow for air flow to enter the vehicle under-hood compartment and provide sufficient engine cooling. A degree of opening of the grille vanes (or lowering of the AAD) may be output by a controller based on an algorithm, model or look-up table that uses at least vehicle speed and engine temperature as inputs. The method then ends.

If a vehicle-off event is confirmed, then at 506, the method includes shutting down the engine by disabling fuel delivery and spinning the engine down to rest. At 508, it may be determined if EONV leak test conditions are met. In one example, leak test conditions are met if a threshold duration or distance or travel, or a threshold number of drive cycles, have elapsed since a last leak test was executed. As another example, an EONV leak test may be attempted at each vehicle-off. Further still, the EONV leak test conditions may be confirmed if the engine is expected to remain shut down for longer than a threshold duration (such as at least a duration required to complete the leak test), as inferred based on drive history, navigational input, etc.

If leak test conditions are not met, then at 510, the method includes actuating the AGS and the AAD to default settings for a vehicle-off event. As elaborated with reference to table 600 at 604, this includes actuating the AGS to a fully open position and retracting the AAD to the stowed position. As a result of fully opening the vanes of the AGS and stowing the AAD, air can flow through the AAD and AGS into the under-hood compartment to cool off the engine. Since the engine heat is not required for the EONV test, engine cooling at vehicle-off can be expedited via the AAD and AGS adjustments.

If leak test conditions are met, then at 512, the method includes predicting an amount of heat that is expected to be rejected from the engine to the fuel system and comparing it to a threshold at 514. For example, the estimated heat rejection may be predicted based on a duration of engine operation prior to the vehicle-off (that is, vehicle drive time), an average engine load over the duration, and engine temperature at the vehicle-off. In addition, the estimated heat rejection may be based on a sum of air mass through the engine (as inferred from a summation of MAF sensor output). Further still, the heat rejection may be a function of ambient temperature. These inputs may be provided to a controller which calculates the heat expected to be rejected via a model, algorithm, or look-up table. The threshold may be a non-zero threshold amount of heat rejection required to build sufficient positive pressure or vacuum in the fuel tank to complete the leak test. For example, the threshold amount of heat rejection may enable the fuel tank pressure to rise, upon sealing, up to a pass threshold value, upon which the fuel system can be vented and a positive pressure phase of the leak test can be completed, such as an amount of heat rejection that provides a change in temperature of more than 70 degrees F., and a corresponding change in pressure. Then, upon resealing the fuel system, the higher than threshold heat rejection may enable the fuel tank pressure to fall to a pass threshold value, upon which the fuel system can be vented and a negative pressure phase of the leak test can be completed. In one example, the threshold is a function of the fill level of the fuel tank. As the fill level of the fuel tank decreases, the threshold amount of heat rejection required to complete the EONV test may decrease. The threshold may additionally be a function of ambient pressure or altitude.

If the estimated heat rejection is higher than the threshold, then at 516, the method includes commanding the AAD and AGS to the default vehicle-off settings. For example, the AGS may be commanded to the fully open position and the AAD may be commanded to the fully retracted position. From there the method moves to 520 to seal the fuel system and initiate the leak test.

If the estimated heat rejection is lower than the threshold, then at 518, the method includes adjusting the AAD and the AGS settings to increase heat rejection. Specifically, the AGS may be commanded to a more closed (e.g., fully closed) position while the AAD is lowered, as indicated at table 600 of FIG. 6 (at 606). If sufficient heat is not rejected from the engine to the fuel system upon sealing, a pressure build in the fuel tank may stall out (e.g., pressure rise will have a zero slope) and a positive pressure threshold of the pressure phase of the leak test may not be attained. If the positive pressure threshold is not reached, the positive pressure phase of the leak test is aborted, reducing the completion frequency of the leak monitor. Therefore to improve the likelihood of completing the positive pressure phase of the leak test, the controller may adjust the settings of the AAD and AGS to trap engine and waste heat in the vehicle frame.

In one example, the controller may adjust the settings of the AAD and AGS as a function of the difference between the estimated heat rejection and the threshold. As the difference increases, the degree of closure of the AGS and the degree of lowering of the AAD may be increased. As another example, responsive to the threshold not being met, the AAD may be fully lowered and the AGS may be fully closed. In still another example, the controller may determine a combination of degree of closure of the AGS and degree of lowering of the AAD that retains enough heat in the vehicle frame to provide the threshold heat rejection.

The method then moves to 520 to initiate the positive pressure phase of the leak test. Therein, the fuel system is sealed from the atmosphere by commanding the canister vent valve (CVV) and the fuel tank isolation valve (FTIV) closed. At 522, a pressure rise in the sealed fuel system, as sensed by a fuel tank pressure sensor, is monitored and it is determined if a target pressure has been reached. The target pressure is a pass threshold for the positive pressure leak test. If the target pressure is not reached, it may be determined that still further heat rejection is required. Optionally, at 524, if sufficient time remains to complete the leak test, the controller may further adjust the AGS (e.g., move the vanes to a more closed position) and the AAD (e.g., further lower the air dam) to increase heat rejection. Then, at 526, the target pressure is reassessed. If the target pressure is still not reached, then at 528, the method includes aborting the positive pressure leak test. Aborting the positive pressure leak test includes venting the sealed fuel system by opening the CVV and FTIV. In addition, a code may be set in the controller's memory to indicate that the positive pressure leak test was attempted and then aborted.

Returning to 526, if the target pressure is reached after the additional AAD and AGS adjustments, then at 530, the method includes completing the positive pressure leak test by venting the fuel system and monitoring a rate of pressure decay. Specifically, the CVV is commanded open while maintaining the FTIV closed and a rate of drop in the fuel tank pressure is monitored. At 532, the monitored rate of pressure decay is compared to a threshold rate that is based on a rate of pressure decay in a system with no leak, or a system with a defined orifice size. If the monitored rate of pressure decay from the target pressure value is higher than the threshold rate, then at 536, it may be indicated that there is a fuel system leak. This may including indicating the presence of a leak and the size of the leak (e.g., indicating that the leak has a size larger than the defined orifice size). Indicating the presence of a leak includes setting a diagnostic code or illuminating a malfunction indicator light (MIL). Else, at 534, if the monitored rate of pressure decay from the target pressure value is lower than the threshold rate, it may be indicated that there is no leak. The method then moves to the vacuum phase of the leak test.

At 538, in anticipation of vacuum generation for the vacuum phase of the leak test, the AGS is commanded fully open and the AAD is retracted. If sufficient cooling of the fuel system (due to heat rejection) does not occur, a vacuum build in the fuel tank may stall out (e.g., pressure drop will have a zero slope) and a vacuum threshold of the vacuum phase of the leak test may not be attained. If the vacuum threshold is not reached, the vacuum phase of the leak test is aborted, reducing the completion frequency of the leak monitor. Therefore to improve the likelihood of completing the vacuum phase of the leak test, the controller may retract the AAD and open the AGS, as indicated at table 600 of FIG. 6 (at 608), to increase air flow through the vehicle frame, and heat rejection from the engine and fuel system.

The method then moves to 540 to initiate the vacuum phase of the leak test. Therein, the fuel system is sealed from the atmosphere by commanding the canister vent valve (CVV) and the fuel tank isolation valve (FTIV) closed. At 542, a pressure drop in the sealed fuel system, as sensed by a fuel tank pressure sensor, is monitored and it is determined if a target vacuum level has been reached. The target vacuum is a pass threshold for the vacuum phase of the leak test. If the target vacuum is not reached, it may be determined that still further heat rejection is required. Optionally, at 544, if sufficient time remains to complete the leak test, the controller may further adjust the AGS (e.g., move the vanes to a more open position) and the AAD (e.g., further retract the air dam) to increase heat rejection. Then, at 546, the target vacuum is reassessed. If the target vacuum is still not reached, then at 548, the method includes aborting the vacuum leak test. Aborting the vacuum leak test includes venting the sealed fuel system by opening the CVV and FTIV. In addition, a code may be set in the controller's memory to indicate that the vacuum leak test was attempted and then aborted.

Returning to 542, if the target vacuum is reached after the additional AAD and AGS adjustments, then at 550, the method includes completing the vacuum leak test by venting the fuel system and monitoring a rate of pressure decay. Specifically, the CVV is commanded open while maintaining the FTIV closed and a rate of rise in the fuel tank pressure (or rate of drop in fuel tank vacuum level) is monitored. At 552, the monitored rate of vacuum decay is compared to a threshold rate that is based on a rate of vacuum decay in a system with no leak, or a system with a defined orifice size. If the monitored rate of vacuum decay from the target pressure value is higher than the threshold rate, then at 556, it may be indicated that there is a fuel system leak. This may including indicating the presence of a leak and the size of the leak (e.g., indicating that the leak has a size larger than the defined orifice size). Indicating the presence of a leak includes setting a diagnostic code or illuminating a malfunction indicator light (MIL). In response to the indication of a fuel system leak, on the next drive cycle, the controller may continue to purge even with a clean canister. The rationale is that by purging, vacuum is generated inside the fuel tank which suppresses the escape of vapor to atmosphere. Typically, the purging terminates once canister is cleaned out, but continuing to purge for the sake of generating in-tank vacuum limits evaporative emissions in the presence of a leak. Else, at 554, if the monitored rate of vacuum decay from the target vacuum value is lower than the threshold rate, it may be indicated that there is no leak. The method then ends and the monitor exits.

Figure 7:
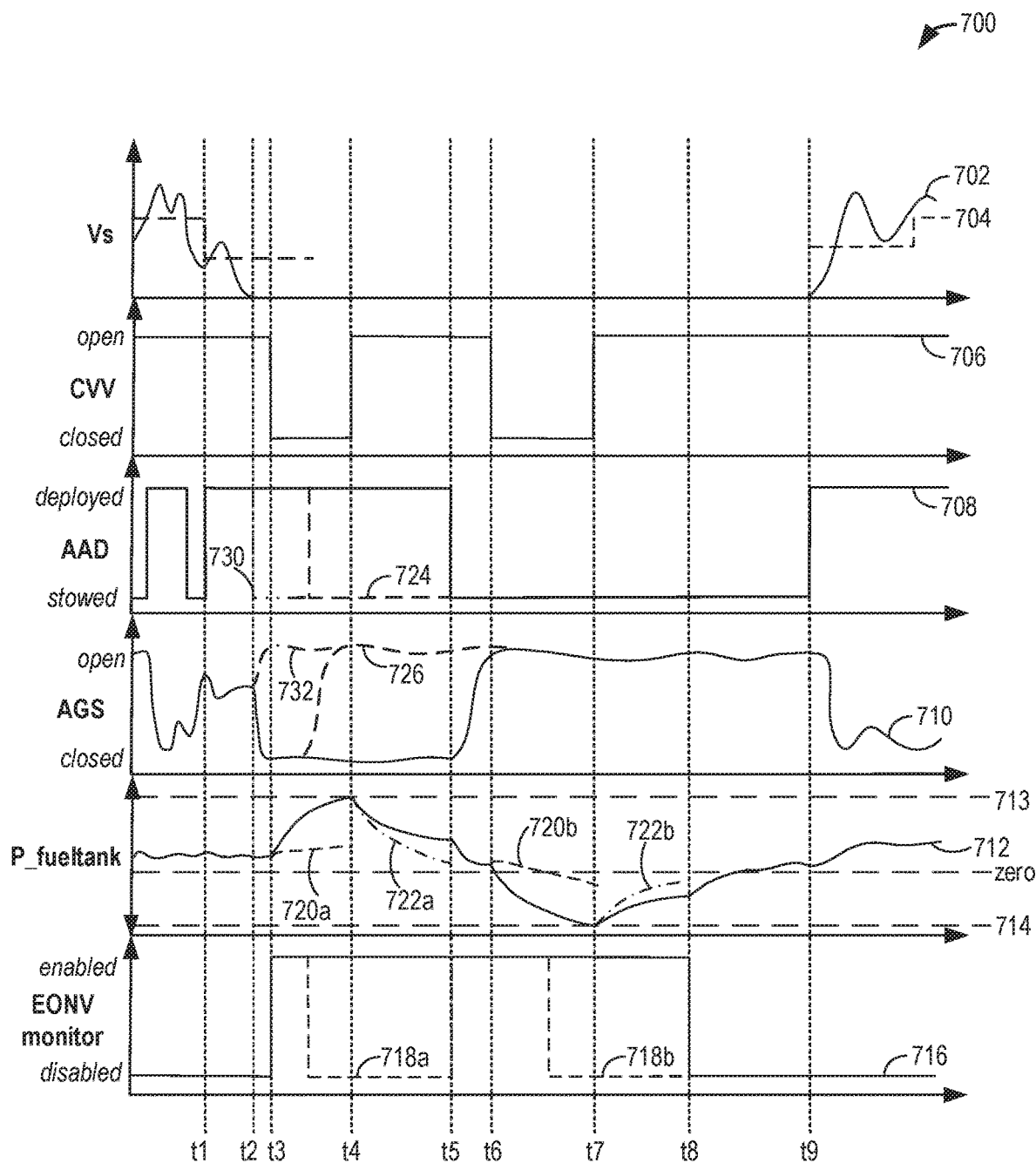
FIG. 7 shows a prophetic example of AAD and AGS adjustments during pressure and vacuum phases of an engine-off natural vacuum leak test.

A prophetic example of an engine-off leak test in a vehicle is now shown with reference to FIG. 7. Map 700 depicts vehicle speed at plot 702. A variable vehicle speed threshold that is used to actuate the AAD mechanism and/or the AGS mechanism of the vehicle is shown at dashed plot 704. The speed threshold changes with changing vehicle operating conditions, such as wind speed in an aft-to-for direction and/or barometric pressure (or altitude). The AAD mechanism may be actuated (plot 708) to a deployed state when the vehicle speed exceeds speed threshold 704, and to a stowed state when the vehicle speed falls below speed threshold 704. The AGS mechanism may be actuated (plot 710) to any degree of opening between a fully open and a fully closed setting, the degree of opening decreased at higher vehicle speeds (such as above speed threshold 704) and the opening increased at lower vehicle speeds (such as below speed threshold 704). The position of a canister vent valve (open or closed) is shown at plot 706. When closed, the fuel system of the vehicle is sealed from the atmosphere. When the CVV is opened, the fuel system of the vehicle is vented to the atmosphere. Changes to the pressure of a fuel tank during the execution of an EONV test are shown at plot 712, and may be sensed via a fuel tank pressure sensor. During the test, the fuel tank pressure may be compared to a positive pressure threshold 713 and a negative pressure threshold 714. Pressure values above the dashed line representative of zero pressure reflect fuel tank positive pressure levels, while pressure values below the dashed line representative of zero pressure reflect fuel tank vacuum levels. The status of an EONV monitor (enabled or disabled) is shown at plot 716. All plots are shown over time, along the x-axis.

From t0 to t2, the vehicle is being propelled with engine torque. The vehicle speed (plot 702) is changing as a function of torque demand and the setting of the vehicle's AAD and AGS mechanisms (plots 708 and 710, respectively) are adjusted as a function of the vehicle speed. Specifically, when the vehicle speed is below threshold 704, the vehicle is operated with the AAD retracted, such as via a command that causes a linkage arm to raise an AAD shutter to a position behind a front bumper of the vehicle. At this speed, there is no significant air drag on the vehicle and so the AAD can be stowed. When the vehicle speed is above threshold 704, the vehicle is operated with the AAD actuated to a deployed position, such as via a command that causes the linkage arm to lower the AAD shutter from behind the front bumper of the vehicle to below the bumper.

From t0 to t1, the vehicle speed threshold 704 is a default speed threshold. At t1, there is a drop is the speed threshold due to reasons such as an increase in the aft-to-fore wind speed (or tail wind speed) on the vehicle. In the presence of tail wind, lowering the AAD earlier (at a lower vehicle speed) allows the AAD to deflect oncoming air (ram air, head wind, or wind in a for-to-aft direction) to achieve improved aerodynamic flow (plot 710).

Likewise, between t0 and t2, as the vehicle speed increases, the AGS vanes are moved to a more closed position (plot 712) to reduce the drag force applied by air flow on the vehicle. When the vehicle speed decreases, the AGS vanes are moved to a more open position to increase the flow of cooling air through the engine and under-hood region of the vehicle, to allow for increased engine cooling.

Since the engine is combusting fuel between t0 and t2, an engine-off leak detection monitor is not run (plot 716) and the CVV is held open (plot 706) so that the fuel system can be vented to the atmosphere if required. The fuel tank pressure is holding steady at this time (plot 712).

Shortly before t2, the vehicle is decelerated to a stop and at t2, the vehicle is put in a vehicle off conditions, such as keyed-off or turned off with another input element such as via a fob or a button on a vehicle panel). Responsive to the vehicle-off indication, an EONV routine is planned to be initiated at t3. At t2, it is determined that there may not be sufficient heat rejected from the engine for the EONV test to be successfully completed. For example, this may be due to cooler ambient temperatures at t2 and/or due to limited engine operation time on the drive cycle that ended at t2. Accordingly, between t2 and t3, to better enable the pressure phase of the EONV leak test to reach a pass threshold, the amount of heat rejection from the engine is increased by actuating the AGS to a fully closed position. In addition, the AAD is maintained in the deployed position. By lowering the AAD and closing the AGS, engine and waste heat generated during the preceding vehicle operation may be retained within the vehicle frame and rejected to the fuel system. As such, if an EONV routine were not planned, then responsive to the vehicle-off condition, the AAD would have been stowed, as indicated at dashed and dotted segment 730, and the AGS would have been fully opened, as indicated at dashed and dotted segment 732. Likewise, if sufficient heat was rejected, then the AAD may have been stowed and the AGS may have been opened at t2.

At t3, the EONV monitor is initiated by sealing the fuel system from the atmosphere. This includes commanding a canister vent valve (CVV) closed, the CVV coupling a fuel system canister to the atmosphere along a vent. In addition, an FTIV coupling the fuel tank to the canister may also be closed (not shown). As a result of the sealing, and the heat rejection from the engine to the fuel system, the fuel tank pressure starts to rise. At t4, the fuel tank pressure reaches a positive pressure threshold 713. Since the pass threshold for the positive pressure phase of the EONV test is met, the positive pressure phase of the EONV test can be completed. This includes opening the CVV at t4 and monitoring a rate of pressure decay between t4 and t5. If the rate of positive pressure decay is as expected, then no leak is inferred (as in the case of solid line 712). If the rate of positive pressure decay is higher than expected, then a leak is indicated, as shown at dashed and dotted segment 722a.

If there is insufficient heat rejection to the fuel system, then between t3 and t4, upon sealing the fuel system, there may not be a sufficient pressure rise and the positive pressure threshold 713 may not be met in the limited time available for the pressure phase of the leak test. This is shown at dashed segment 720a. If the pressure rise has a substantially zero slope and the positive pressure threshold is not met, then the positive pressure phase of the leak test would be aborted (as shown at dashed segment 718a) and the controller would move directly on to the vacuum phase of the leak test.

Returning to t5, after completing the positive pressure phase of the leak test, the fuel system is vented, for example, by opening the FTIV while maintaining the CVV open. Also between t5 and t6, in anticipation of vacuum generation for the vacuum phase of the leak test, AAD and AGS adjustments are used to enhance engine cooling. As such, engine and fuel system cooling is leveraged to cause a drop in pressure in the fuel tank. To better enable the vacuum phase of the EONV leak test to reach a corresponding pass threshold, the amount of engine and fuel system cooling is increased by actuating the AGS to a fully open position. In addition, the AAD is shifted to the stowed position. By raising the AAD and opening the AGS, air flow through the engine and under-hood region of the vehicle is increased, enabling a larger and faster temperature and pressure dip at the fuel system.

At t6, the vacuum phase of the EONV monitor is initiated by resealing the fuel system from the atmosphere. This includes commanding the CVV and FTIV closed. As a result of the sealing, and the cooling air flow through the engine, the fuel tank pressure starts to fall. At t7, the fuel tank pressure reaches a negative pressure threshold 714. Since the pass threshold for the negative pressure phase of the EONV test is met, the negative pressure phase of the EONV test can be completed. This includes opening the CVV at t7 and monitoring a rate of vacuum decay between t7 and t8. If the rate of vacuum decay is as expected, then no leak is inferred (as in the case of solid line 712). If the rate of vacuum decay is higher than expected, then a leak is indicated, as shown at dashed and dotted segment 722b.

If there is insufficient cooling of the engine, then between t6 and t7, upon sealing the fuel system, there may not be a sufficient pressure drop and the negative pressure threshold 714 may not be met in the limited time available for the vacuum phase of the leak test. This is shown at dashed segment 720*b*. If the vacuum rise has a substantially zero slope and the negative pressure threshold is not met, then the negative pressure phase of the leak test would be aborted (as shown at dashed segment 718*b*) and the controller would indicate that the leak test was attempted but not completed.

Returning to t8, after completing the vacuum phase of the leak test, the fuel system is vented, for example, by opening the FTIV while maintaining the CVV open. The CVV is then maintained open while the vehicle remains keyed off. In addition, the AAD and AGS are transitioned to default vehicle off settings including the AAD remaining stowed and the AGS being fully opened. The default vehicle off settings are then held until the vehicle is keyed-on and the engine is restarted.

At t9, a key-on event occurs at which time the engine is restarted and the vehicle is resumed being propelled using at least engine torque. Accordingly, the AAD and AGS are returned to being controlled based on vehicle speed relative to speed threshold 704. In the depicted example, the vehicle speed remains above the variable speed threshold after t9 and therefore the AAD is operated in the deployed state while the AGS opening is maintained reduced (but not fully closed).

In this way, aerodynamic systems available on-board a vehicle may be deployed after a vehicle off event to trap vehicle heat for an engine-off natural vacuum leak test. The technical effect of closing the vanes of an active grille shutter system and lowering the air dam panel of an active air dam system is that ambient air flow into the engine and an underbody region of a vehicle is reduced, reducing engine cooling during a pressure phase of the leak test. By trapping a larger portion of the engine and waste heat, increased heat rejection from the engine to the fuel system is enabled during the pressure phase, increasing the likelihood of sufficient positive pressure being built in the fuel tank for execution of a positive pressure leak test. As a result, an EONV test can pass quicker in the pressure phase and not rely only on the vacuum phase. The technical effect of opening the vanes of the active grille shutter system and retracting the air dam panel of the active air dam system after completion of the positive pressure leak test is that ambient air flow into the engine and an underbody region of a vehicle is increased, increasing engine cooling and vacuum generation during a vacuum phase of the leak test. As a result, the likelihood of sufficient vacuum being built in the fuel tank for execution of a vacuum based leak test is increased. By increasing the completion frequency of the positive and vacuum phase of the leak test, the performance and response time of the leak monitor is improved while reducing vehicle battery drain.

One example method for a vehicle, comprises: responsive to a vehicle off event, transitioning an active air dam system (AAD) of the vehicle to a more deployed position; and transitioning an active grille shutter system (AGS) of the vehicle to a more closed position. In the preceding example, additionally or optionally, the method further comprises, sealing a fuel system from atmosphere responsive to the vehicle off event; and maintaining the AAD more deployed and the AGS more closed until a fuel tank pressure in the sealed fuel system is higher than a first threshold. In any or all of the preceding examples, additionally or optionally, the method further comprises: predicting fuel tank pressure rise in the sealed fuel system as a function of each of vehicle drive time prior to the vehicle off event, mass air flow through an engine of the vehicle prior to the vehicle off event, ambient temperature at the vehicle off event; and increasing a degree of closing of the AGS when the predicted fuel tank pressure rise is to less than the first threshold. In any or all of the preceding examples, additionally or optionally, the method further comprises: after fuel tank pressure rises to the first threshold, venting the fuel system and detecting a leak in the fuel system based on a rate of decay of the fuel tank pressure. In any or all of the preceding examples, additionally or optionally, the method further comprises: after venting the fuel system: resealing the fuel system while transitioning the AAD to a more retracted position and transitioning the AGS to a more open position; and maintaining the AAD more retracted and the AGS more open until the fuel tank pressure in the sealed fuel system is lower than a second threshold, the second threshold lower than the first threshold. In any or all of the preceding examples, additionally or optionally, the method further comprises: predicting fuel tank pressure drop in the resealed fuel system as a function of each of vehicle drive time prior to the vehicle off event, mass air flow through the engine prior to the vehicle off event, and ambient temperature at the vehicle off event; and increasing a degree of opening of the AGS when the predicted fuel tank pressure drop is to a pressure above than the second threshold. In any or all of the preceding examples, additionally or optionally, the method further comprises: after fuel tank pressure drops to the second threshold, venting the fuel system and detecting a leak in the fuel system based on a rate of rise of the fuel tank pressure. In any or all of the preceding examples, additionally or optionally, the vehicle off event is a first vehicle off event at which an engine-off natural vacuum leak test monitor is run, the method further comprising, responsive to a second vehicle off event at which the monitor is not run, transitioning the AAD to a retracted position; and transitioning the AGS to a more open position. In any or all of the preceding examples, additionally or optionally, transitioning the AAD to the more deployed position includes lowering an air dam below a vehicle bumper via a linkage coupled to the air dam, and transitioning the AAD to the more retracted position includes raising the air dam and stowing the air dam behind the vehicle bumper via the linkage. In any or all of the preceding examples, additionally or optionally, transitioning the AGS to the more closed position includes actuating a motor coupled to vanes of a vehicle front grille to move the vanes substantially perpendicular to the front grille, and transitioning the AGS to the more open position includes actuating the motor coupled to the vanes of the vehicle front grille to move the vanes substantially parallel to the front grille.

Another example method for a vehicle comprises: at vehicle-off, responsive to conditions for a fuel system leak test being met, initially lowering an air dam below a vehicle bumper while closing vanes of a vehicle front grille; and after executing a pressure phase of the leak test, raising the dam behind the vehicle bumper while opening the vanes of the vehicle front grille. In any or all of the preceding examples, additionally or optionally, the pressure phase of the leak test is conducted with the air dam lowered and the vanes closed, the method further comprising: executing a vacuum phase of the leak test with the air dam raised and the vanes open. In any or all of the preceding examples, additionally or optionally, the method further comprises: after executing the vacuum phase of the leak test, maintaining the air dam raised and the vanes open until a subsequent key-on. In any or all of the preceding examples, additionally or optionally, during the initially lowering the air dam and closing the vanes, adjusting each of a degree of lowering the air dam relative to a stowed position and a degree of closing the vanes relative to a fully open position based on one or more of engine operation time prior to the vehicle-off, integrated air mass flow through the engine prior to the vehicle-off, ambient temperature at the vehicle-off, and fuel tank fill level at the vehicle-off. In any or all of the preceding examples, additionally or optionally, the air dam is lowered further from the stowed position and the vanes are closed further from the fully open position as the engine operation time decreases, the integrated air mass flow decreases, the ambient temperature decreases or the fuel tank fill level decreases.

Another example vehicle system comprises: an engine; a fuel system including a fuel tank, a fuel vapor canister, a vent valve coupling the canister to atmosphere, and an isolation valve coupling the canister to the fuel tank; a pressure sensor coupled to the fuel system; an active air dam (AAD) coupled to a bumper of a vehicle body via a linkage; an active grille system (AGS) including a plurality of movable vanes coupled to a front grille of the vehicle body; and a controller storing instructions in non-transitory memory executable to: while the vehicle is keyed-on, adjust a setting of each of the AAD and the AGS as a function of vehicle speed; and while the vehicle is keyed-off, adjust the setting of each of the AAD and the AGS as a function of pressure phase or vacuum phase of an engine-off leak test. In the preceding example, additionally or optionally, when the vehicle is keyed-on, the AAD is deployed while the AGS is closed at higher than threshold vehicle speeds and the AAD is retracted while the AGS is opened at lower than threshold vehicle speeds, and where when the vehicle is keyed-off, the AAD is deployed while the AGS is closed during the pressure phase of the leak test, and the AAD is retracted while the AGS is opened during the vacuum phase of the leak test. In any or all of the preceding examples, additionally or optionally, a degree of deployment of the AAD and a degree of closure of the AGS is increased during the pressure phase to raise a fuel tank pressure of the fuel system, when sealed, to above a first threshold pressure level, and wherein the degree of deployment of the AAD and the degree of closure of the AGS is decreased during the vacuum phase to lower the fuel tank pressure of the fuel system, when sealed, to below a first threshold vacuum level. In any or all of the preceding examples, additionally or optionally, the controller includes further instructions that are executable to: estimate heat rejection from the engine to the fuel system when the vehicle is keyed-off as a function of each of engine operation time prior to vehicle-off, integrated air mass flow through the engine prior to the vehicle-off, and ambient temperature at the vehicle-off; and increase a degree of deployment of the AAD and a degree of closure of the AGS as the estimated heat rejection falls below a threshold heat, the threshold heat determined as a function of fuel temperature and fuel tank fill level at the vehicle-off. In any or all of the preceding examples, additionally or optionally, the AAD is actuated to the deployed position by lowering the air dam below the vehicle bumper via the linkage, and the AAD is actuated to the retracted position by raising and stowing the air dam behind the vehicle bumper via the linkage; and wherein the AGS is closed by actuating the plurality of movable vanes, via a motor, to be substantially perpendicular to the front grille, and the AGS is opened by actuating the vanes to be substantially parallel to the front grille.

In another representation, the vehicle is a hybrid vehicle system. In a further representation, the vehicle is an autonomous vehicle system. In another representation, a method for a vehicle includes, responsive to vehicle-off, and further responsive to engine-off leak test conditions being met, sealing a fuel system by closing a canister vent valve, and raising a fuel tank pressure to a pass threshold of a positive pressure phase of the leak test via adjustments to each of an active air dam and an active grille shutter system of the vehicle. In the preceding example, additionally or optionally, the adjustments during the positive pressure phase include actuating the active air dam to a more deployed position and actuating vanes of the grille shutter system to a more closed position. In any or all of the preceding examples, additionally or optionally, the method further comprises raising a fuel tank vacuum of the sealed fuel system to a pass threshold of a vacuum phase of the leak test via adjustments to each of the active air dam and the active grille shutter system of the vehicle. In the preceding example, additionally or optionally, the adjustments during the vacuum phase include actuating the active air dam to a more retracted position and actuating vanes of the grille shutter system to a more open position.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
 responsive to a vehicle off event,
 transitioning an active air dam system (AAD) of a vehicle to a more deployed position;
 transitioning an active grille shutter system (AGS) of the vehicle to a more closed position;
 sealing a fuel system from atmosphere responsive to the vehicle off event; and
 maintaining the AAD more deployed and the AGS more closed until a fuel tank pressure in the sealed fuel system is higher than a first threshold.

2. The method of claim 1, further comprising:
 predicting fuel tank pressure rise in the sealed fuel system as a function of each of vehicle drive time prior to the off event, mass air flow through an engine of the vehicle prior to the off event, ambient temperature at the vehicle off event; and
 increasing a degree of closing of the AGS when the predicted fuel tank pressure rise is to less than the first threshold.

3. The method of claim 1, further comprising, after fuel tank pressure rises to the first threshold, venting the fuel system and detecting a leak in the fuel system based on a rate of decay of the fuel tank pressure.

4. The method of claim 3, further comprising, after venting the fuel system:
 resealing the fuel system while transitioning the AAD to a more retracted position and transitioning the AGS to a more open position; and
 maintaining the AAD more retracted and the AGS more open until the fuel tank pressure in the sealed fuel system is lower than a second threshold, the second threshold lower than the first threshold.

5. The method of claim 4, further comprising:
 predicting fuel tank pressure drop in the resealed fuel system as a function of each of vehicle drive time prior to the vehicle off event, mass air flow through the engine prior to the vehicle off event, and ambient temperature at the vehicle off event; and
 increasing a degree of opening of the AGS when the predicted fuel tank pressure drop is to a pressure above than the second threshold.

6. The method of claim 5, further comprising, after fuel tank pressure drops to the second threshold, venting the fuel system and detecting a leak in the fuel system based on a rate of rise of the fuel tank pressure.

7. A method, comprising:
 responsive to a vehicle off event,
  transitioning an active air dam system (AAD) of a vehicle to a more deployed position;
  transitioning an active grille shutter system (AGS) of the vehicle to a more closed position, wherein the vehicle off event is a first vehicle off event at which an engine-off natural vacuum leak test monitor is run, the method further comprising, responsive to a second vehicle off event at which the monitor is not run, transitioning the AAD to a retracted position; and transitioning the AGS to a more open position.

8. The method of claim 4, wherein transitioning the AAD to the more deployed position includes lowering an air dam below a vehicle bumper via a linkage coupled to the air dam, and transitioning the AAD to the more retracted position includes raising the air dam and stowing the air dam behind the vehicle bumper via the linkage.

9. The method of claim 4, wherein transitioning the AGS to the more closed position includes actuating a motor coupled to vanes of a vehicle front grille to move the vanes substantially perpendicular to the front grille, and transitioning the AGS to the more open position includes actuating the motor coupled to the vanes of the vehicle front grille to move the vanes substantially parallel to the front grille.

10. A method for a vehicle, comprising:
 at a vehicle-off event, responsive to conditions for a fuel system leak test being met,
 initially lowering an air dam below a vehicle bumper while closing vanes of a vehicle front grille; and
 after executing a pressure phase of the leak test, raising the dam behind the vehicle bumper while opening the vanes of the vehicle front grille.

11. The method of claim 10, wherein the pressure phase of the leak test is conducted with the air dam lowered and the vanes closed, the method further comprising: executing a vacuum phase of the leak test with the air dam raised and the vanes open.

12. The method of claim 11, further comprising, after executing the vacuum phase of the leak test, maintaining the air dam raised and the vanes open until a subsequent vehicle-on event.

13. The method of claim 10, wherein during the initially lowering the air dam and closing the vanes, adjusting each of a degree of lowering the air dam relative to a stowed position and a degree of closing the vanes relative to a fully open position based on one or more of engine operation time prior to the vehicle-off event, integrated air mass flow through the engine prior to the vehicle-off event, ambient temperature at the vehicle-off event, and fuel tank fill level at the vehicle-off event.

14. The method of claim 13, wherein the air dam is lowered further from the stowed position and the vanes are closed further from the fully open position as the engine operation time decreases, the integrated air mass flow decreases, the ambient temperature decreases or the fuel tank fill level decreases.

15. A vehicle system, comprising:
 an engine;
 a fuel system including a fuel tank, a fuel vapor canister, a vent valve coupling the canister to atmosphere, and an isolation valve coupling the canister to the fuel tank;
 a pressure sensor coupled to the fuel system;
 an active air dam (AAD) coupled to a bumper of a vehicle body via a linkage;
 an active grille system (AGS) including a plurality of movable vanes coupled to a front grille of the vehicle body; and
 a controller storing instructions in non-transitory memory executable to:
  while the vehicle is actuated on, adjust a setting of each of the AAD and the AGS as a function of vehicle speed; and
  while the vehicle is actuated-off, adjust the setting of each of the AAD and the AGS as a function of pressure phase or vacuum phase of an engine-off leak test.

16. The system of claim 15, wherein when the vehicle is actuated on, the AAD is deployed while the AGS is closed at higher than threshold vehicle speeds and the AAD is retracted while the AGS is opened at lower than threshold vehicle speeds, and where when the vehicle is actuated off, the AAD is deployed while the AGS is closed during the pressure phase of the leak test, and the AAD is retracted while the AGS is opened during the vacuum phase of the leak test.

17. The system of claim 16, wherein a degree of deployment of the AAD and a degree of closure of the AGS is increased during the pressure phase to raise a fuel tank pressure of the fuel system, when sealed, to above a first threshold pressure level, and wherein the degree of deployment of the AAD and the degree of closure of the AGS is decreased during the vacuum phase to lower the fuel tank pressure of the fuel system, when sealed, to below a first threshold vacuum level.

18. The system of claim 16, wherein the controller includes further instructions that are executable to:

estimate heat rejection from the engine to the fuel system when the vehicle is keyed-off as a function of each of engine operation time prior to the vehicle being actuated off, integrated air mass flow through the engine prior to the vehicle being actuated off, and ambient temperature at the vehicle being actuated off; and increase a degree of deployment of the AAD and a degree of closure of the AGS as the estimated heat rejection falls below a threshold heat, the threshold heat determined as a function of fuel temperature and fuel tank fill level at the vehicle actuated-off.

19. The system of claim 17, wherein the AAD is actuated to the deployed position by lowering the air dam below the vehicle bumper via the linkage, and the AAD is actuated to the retracted position by raising and stowing the air dam behind the vehicle bumper via the linkage; and wherein the AGS is closed by actuating the plurality of movable vanes, via a motor, to be substantially perpendicular to the front grille, and the AGS is opened by actuating the vanes to be substantially parallel to the front grille.

* * * * *